(12) United States Patent
Kim et al.

(10) Patent No.: US 10,963,678 B2
(45) Date of Patent: Mar. 30, 2021

(54) FACE RECOGNITION APPARATUS AND FACE RECOGNITION METHOD

(71) Applicants: HYUNDAI MOTOR COMPANY, Seoul (KR); KIA MOTORS CORPORATION, Seoul (KR)

(72) Inventors: Sam Yong Kim, Hwaseong-si (KR); Jin Kwon Kim, Suwon-si (KR); Byoung Joon Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 46 days.

(21) Appl. No.: 16/447,164

(22) Filed: Jun. 20, 2019

(65) Prior Publication Data
US 2020/0151433 A1    May 14, 2020

(30) Foreign Application Priority Data
Nov. 14, 2018   (KR) .......................... 10-2018-0140193

(51) Int. Cl.
*G06K 9/00*    (2006.01)
(52) U.S. Cl.
CPC ..... *G06K 9/00288* (2013.01); *G06K 9/00228* (2013.01); *G06K 9/00268* (2013.01)

(58) Field of Classification Search
None
See application file for complete search history.

(56) References Cited

U.S. PATENT DOCUMENTS

| | | | |
|---|---|---|---|
| 2013/0073114 A1* | 3/2013 | Nemat-Nasser | B60W 40/09 701/1 |
| 2017/0262718 A1* | 9/2017 | Noma | G06K 9/52 |
| 2018/0322652 A1* | 11/2018 | Lee | G06T 7/74 |
| 2019/0005217 A1* | 1/2019 | Kim | G06K 9/6202 |

FOREIGN PATENT DOCUMENTS

| JP | 2002288670 A | * | 10/2002 |
|---|---|---|---|
| KR | 100467152 B1 | * | 1/2005 |
| KR | 20120074820 A | * | 7/2012 |

* cited by examiner

*Primary Examiner* — Delomia L Gilliard
(74) *Attorney, Agent, or Firm* — McDonnell Boehnen Hulbert & Berghoff LLP

(57) ABSTRACT

The present disclosure relates to a face recognition apparatus and method. The face recognition apparatus includes a camera that captures a face image a driver, a database (DB) that stores face data including the face image and one or more environmental conditions corresponding to the face image, and a controller that, when a face recognition function is performed, extracts the face data from the DB based on an environmental condition at a time of recognizing a face, and recognizes a face of the driver based on a face image of the extracted face data.

22 Claims, 16 Drawing Sheets

| Data No. | FACE IMAGE | WINDOW OPENING | SUNROOF OPENING | TIME ZONE (DAY/NIGHT /SUNRISE/SUNSET) | FACIAL EXPRESSION (BY MOUTH/EYE SIZE) | FACE DIRECTION (FRONT/LEFT/RIGHT) | WEARING OF SUNGLASSES | WEARING OF MASK |
|---|---|---|---|---|---|---|---|---|
| 1 | | × | × | DAY | IMPASSIVE EXPRESSION | FRONT | × | × |
| 2 | | × | × | DAY | IMPASSIVE EXPRESSION | RIGHT | × | × |
| 3 | | ○ | × | DAY | SMILING EXPRESSION | FRONT | × | × |
| 4 | | × | × | DAY | IMPASSIVE EXPRESSION | FRONT | × | ○ |
| 5 | | × | ○ | SUNSET | IMPASSIVE EXPRESSION | FRONT | ○ | × |

FIG. 6

| Data No. | WINDOW OPENING | SUNROOF OPENING | TIME ZONE(DAY/NIGHT /SUNRISE/SUNSET) | FACIAL EXPRESSION (BY MOUTH/EYE SIZE) | FACE DIRECTION (FRONT/LEFT/RIGHT) | | WEARING OF SUNGLASSES | WEARING OF MASK | HAMMING DISTANCE (NON-APPLY OF WEIGHT) |
|---|---|---|---|---|---|---|---|---|---|
| 1 | × | × | DAY | IMPASSIVE EXPRESSION | FRONT | | × | × | 0 |
|   | 0 | 0 | 0 | 0 | 0 | | 0 | 0 |   |
| 2 | × | × | DAY | IMPASSIVE EXPRESSION | RIGHT | | × | × | 1 |
|   | 0 | 0 | 0 | 0 | 2 | | 0 | 0 |   |
| 3 | ○ | × | DAY | SMILING EXPRESSION | FRONT | | × | × | 2 |
|   | 1 | 0 | 0 | 1 | 0 | | 0 | 0 |   |

FIG.7

| DIVISION | WINDOW OPENING | SUNROOF OPENING | TIME ZONE(DAY/NIGHT /SUNRISE/SUNSET) | FACIAL EXPRESSION (BY MOUTH/EYE SIZE) | FACE DIRECTION (FRONT/LEFT/RIGHT) | WEARING OF SUNGLASSES | WEARING OF MASK |
|---|---|---|---|---|---|---|---|
| No.1 | 0 | 0 | 0 | 0 | 0 | 0 | 0 |
| No.2 | 0 | 0 | 0 | 0 | 2 | 0 | 0 |
| SAME OR DIFFERENT | 0 (SAME) | | | | 1 (DIFFERENT) | | |
| HAMMING DISTANCE | 0+0+0+0+1+0+0 = 1 | | | | | | |

FIG.8

| ENVIRONMENT | WINDOW OPENING | SUNROOF OPENING | TIME ZONE(DAY/NIGHT /SUNRISE/SUNSET) | FACIAL EXPRESSION (BY MOUTH/EYE SIZE) | FACE DIRECTION (FRONT/LEFT/RIGHT) | WEARING OF SUNGLASSES | WEARING OF MASK |
|---|---|---|---|---|---|---|---|
| WEIGHT | 1~2 | 3~4 | 1~2 | 2 | 2 | 2 | 3 |

FIG.9A

| No. | WINDOW OPENING (WEIGHT:1) | SUNROOF OPENING | TIME ZONE(DAY/NIGHT /SUNRISE/SUNSET) | FACIAL EXPRESSION (BY MOUTH/EYE SIZE) | FACE DIRECTION (FRONT/LEFT/RIGHT) | WEARING OF SUNGLASSES | WEARING OF MASK | HAMMING DISTANCE (APPLY OF WEIGHT) |
|---|---|---|---|---|---|---|---|---|
| 1 | × | × | DAY | IMPASSIVE EXPRESSION | FRONT | × | × | 0 |
|   | ○ | ○ | ○ | ○ | ○ | ○ | ○ |   |
| 2 | × | × | DAY | IMPASSIVE EXPRESSION | RIGHT | × | × | 2 |
|   | ○ | ○ | ○ | ○ | 2 | ○ | ○ |   |

FIG. 9B

FACE RECOGNITION APPARATUS AND FACE RECOGNITION METHOD

CROSS REFERENCE TO RELATED APPLICATION

This application is claims the benefit of priority to Korean Patent Application No. 10-2018-0140193, filed in the Korean Intellectual Property Office on Nov. 14, 2018, the entire contents of which are incorporated herein by reference.

TECHNICAL FIELD

The present disclosure relates to a face recognition apparatus and a face recognition method.

BACKGROUND

Recently, functions for setting a profile for each driver and performing control according to the settings, such as IMS (Integrated Memory Systems), USM (User Setting Menu), and the like have been adopted by vehicles.

A driver needs be authenticated to perform such a function. Near Field Communication (NFC) of smartphones, fingerprint recognition, face recognition and the like may be applied as driver authentication methods.

The face recognition is advantageous in that registration and recognition are possible naturally as compared to the NFC of smart phones, the fingerprint recognition and the like.

However, the face recognition may have a problem that the recognition performance is reduced due to facial occlusion phenomenon or a change in a surrounding environmental factor.

SUMMARY

The present disclosure has been made to solve the above-mentioned problems occurring in the prior art while advantages achieved by the prior art are maintained intact.

An aspect of the present disclosure provides a face recognition apparatus and method which prevent performance of driver face recognition from being degraded due to a change in an environmental factor by classifying and storing face data of a driver according to a plurality of environmental conditions.

An aspect of the present disclosure provides a face recognition apparatus and method, which improve performance of face recognition by assigning a weight to each environmental factor, calculating a Hamming distance, and performing face recognition based on face data having a similar condition.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a face recognition apparatus includes a camera that captures a face image a driver, database (DB) that stores face data including the face image and one or more environmental conditions corresponding to the face image, and a controller that, when a face recognition function is performed, extracts the face data from the DB based on an environmental condition at a time of recognizing a face, and recognizes a face of the driver based on a face image of the extracted face data.

The controller may extract face data of an environmental condition having a highest degree of similarity to the environmental condition at the time of recognizing the face, among the face data stored in the DB.

The face recognition apparatus may further include a determination device that compares environmental factors of an environmental condition included in the face data with environmental factors of the environmental condition at the time of recognizing the face, calculates a hamming distance for each of the environmental factors, and determines a degree of similarity based on the calculated hamming distances for the environmental factors.

The face recognition apparatus may further include a conversion device that encodes each of the environmental factors of the environmental condition included in the face data and the environmental condition at the time of recognizing the face.

The determination device may calculate a Hamming distance by performing comparison on the encoded environmental factors.

The determination device may calculate a Hamming distance of a corresponding environmental factor as '0' when codes of environmental factors corresponding to each other, among the environmental condition included in the face data and the environmental condition at the time of recognizing the face, are equal to each other and calculates the Hamming distance as '1' otherwise.

The determination device may determine that the degree of similarity is higher as a sum of the calculated Hamming distances for the environmental factors is smaller.

The determination device may assign weights to the environmental factors respectively, and determines the degree of similarity by respectively applying the weights to the calculated Hamming distances for the environmental factors.

The environmental condition may include at least one environmental factor of feature information extracted from the face image and vehicle state information.

The face recognition apparatus may further include an image analyzer that extracts the feature information by analyzing the face image.

The face recognition apparatus may further include a communication device that receives the vehicle state information.

The controller may acquire the face image and one or more environmental conditions corresponding to the face image in real time or at predetermined time intervals during driving of a vehicle.

The controller may further generate face data including the acquired face image and an environmental condition corresponding to the face image when the environmental condition corresponding to the face image is different from an environmental condition of face data pre-stored corresponding to the driver.

Another aspect of the present disclosure provides a face recognition method includes capturing a face image of a driver, storing face data including the captured face image of the driver and one or more environmental conditions corresponding to the face image in database (DB), and when a face recognition function is performed, extracting pre-stored face data from the DB based on an environmental condition at a time of recognizing a face and recognizing a face of the driver based on a face image of the extracted face data.

BRIEF DESCRIPTION OF THE FIGURES

The above and other objects, features and advantages of the present disclosure will be more apparent from the following detailed description taken in conjunction with the accompanying drawings:

FIGS. 5, 6, 7, and 8 illustrate additional embodiments with regard to the operation of a face recognition apparatus;

FIGS. 9A and 9B illustrate additional embodiments with regard to the operation of a face recognition apparatus;

DETAILED DESCRIPTION

Figure 1:
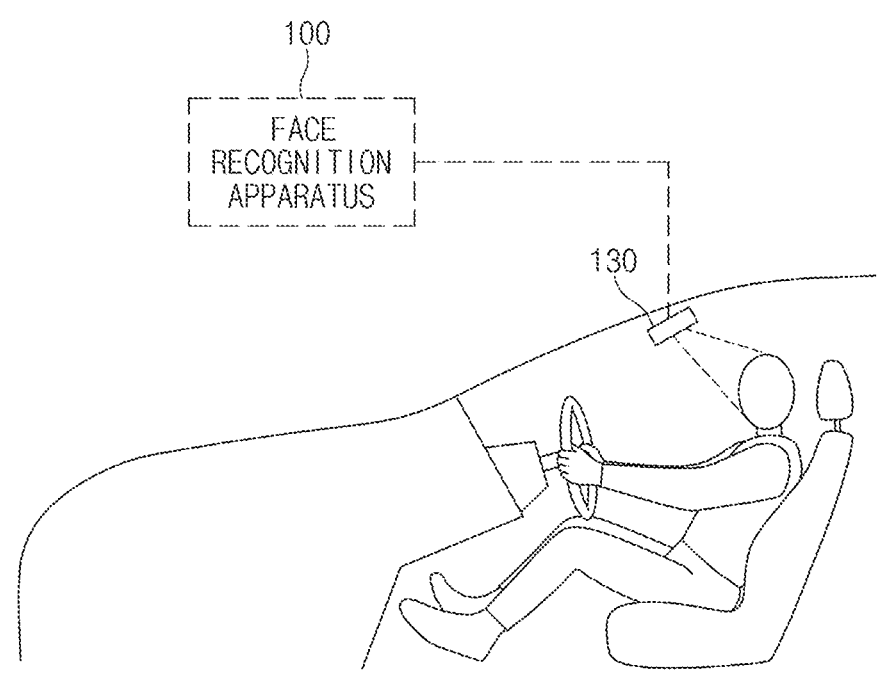
FIG. 1 illustrates a vehicle to which a face recognition apparatus according to an embodiment of the present disclosure is applied.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a vehicle to which a face recognition apparatus according to the present disclosure is applied.

As illustrated in FIG. 1, a face recognition apparatus 100 may acquire a face image of a driver through a camera 130 and register the acquired face image of the driver. In this case, the face recognition apparatus 100 may identify an environmental condition of a vehicle at the time of acquiring the face image of the driver and register information on the identified environmental condition along with the face image of the driver in database (DB) 150.

Subsequently, the face recognition apparatus 100 may extract face data of a similar environmental condition to the environmental condition at the time of recognizing the face of the driver in the case of face recognition, and recognize the face of the driver based on the extracted face data.

The face recognition apparatus 100 according to the disclosure may be implemented in the vehicle. The face recognition apparatus 100 may be formed integrally with in-vehicle control units. On the other hand, the face recognition apparatus 100 may be implemented as a separate apparatus, and may be connected to the control units of the vehicle by separate coupling means.

A detailed configuration of the face recognition apparatus 100 is described with reference to the embodiment of FIG. 2.

Figure 2:
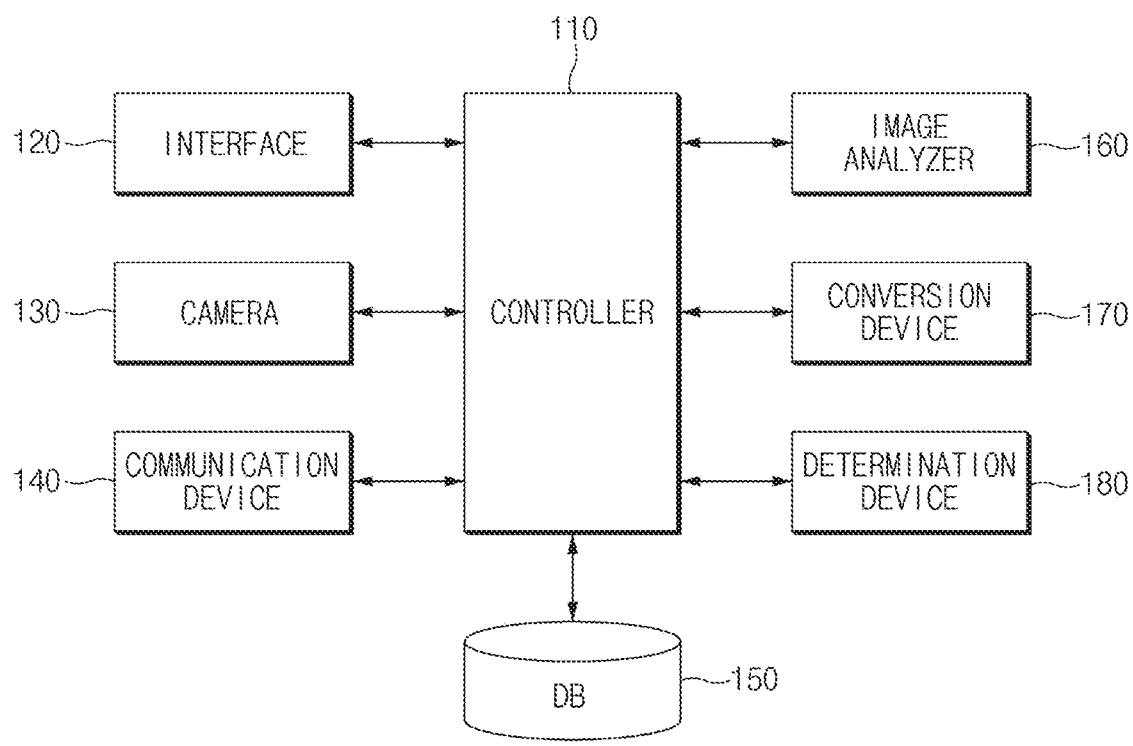
FIG. 2 illustrates a configuration of a face recognition apparatus according to an embodiment of the present disclosure.

FIG. 2 is a diagram illustrating a configuration of a face recognition apparatus according to an embodiment of the present disclosure. Referring to FIG. 2, the face recognition apparatus 100 may include a controller 110, an interface 120, the camera 130, a communication device 140, the database (DB) 150, an image analyzer 160, a conversion device 170, and a determination device 180. In the disclosure, the controller 110, the image analyzer 160, the conversion device 170, and the determination device 180 of the face recognition apparatus 100 according to the present embodiment may be implemented as at least one processor.

The controller 110 may process signals transferred between components of the face recognition apparatus 100.

The interface 120 may include input means for receiving a control command from a driver and output means for outputting an operation state, a result and the like of the face recognition apparatus 100.

In this case, the input means may include a key button, and may also include a mouse, a joystick, a jog shuttle, a stylus pen, and the like. In addition, the input means may also include a soft key implemented on a display.

The output means may include a display and may also include audio output means such as a speaker. In this case, when a touch sensor such as a touch film, a touch sheet, or a touch pad is provided in the display, the display may operate as a touch screen, and may be implemented in a form into which the input means and the output means are integrated.

As an example, the display may display a guidance screen for registration of face data of the driver. In addition, the display may display a screen showing a result of face recognition.

The display may include at least one of a liquid crystal display (LCD), a thin film transistor liquid crystal display (TFT LCD), an organic light-emitting diode (OLED), a flexible display, a field emission display (FED), and a three-dimensional display (3D display).

The camera 130 may be a device that captures a face image of the driver. The camera 130 may be disposed in a position on the front of the driver on the vehicle. The camera 130 may capture the face image of the driver continuously or at regular intervals in a state in which the vehicle is turned on. The camera 130 may transfer the captured face image to the controller 110.

The communication device 140 may include a communication module that supports communication interfaces with electrical components and/or control units provided in the vehicle. As an example, the communication module may receive information on the opened/closed state of a window, the opened/closed state of a sunroof, and/or time zone information from the control units.

In the disclosure, the communication module may include a module supporting vehicle network communication such as CAN (Controller Area Network) communication, LIN (Local Interconnect Network) communication, and FlexRay communication.

In addition, the communication module may include a module for wireless Internet connection or a module for a short range communication. In the disclosure, the wireless Internet technology may include wireless LAN (WLAN), wireless broadband (WIBRO), Wi-Fi, World Interoperability for Microwave Access (WIMAX), and the like, and the short range communication technology may include Bluetooth, ZigBee, Ultra Wideband (UWB), Radio Frequency Identification (RFID), Infrared Data Association (IrDA), and the like.

The DB 150 may store data and/or an algorithm necessary for the apparatus 100 to operate.

The DB 150 may store instructions and/or an algorithm for executing face recognition operation. In addition, the DB 150 may store a plurality of pieces of face data registered for each driver. In this case, the plurality of pieces of face data may be classified and stored according to an environment condition included in the face data.

In the disclosure, the DB 150 may include a random access memory (RAM), a static random access memory (SRAM), a read only memory (ROM), a programmable read-only memory (PROM), an electrically erasable programmable read-only memory (EEPROM) and the like.

When the face image of the driver captured by the camera 130 is received according to a new registration request for a face of the driver, the controller 110 may transmit the received face image to the image analyzer 160.

The image analyzer 160 may analyze the face image and extract feature information.

As an example, the image analyzer 160 may extract size information of a mouth and/or eyes from the face image, and extract feature information on whether facial expression represents an impassive expression or a smiling expression based on the extracted size information of the mouth and/or the eyes.

In addition, the image analyzer 160 may extract, from the face image, feature information on whether a face direction is directed toward the front, the left or the right.

In addition, the image analyzer 160 may extract, from the face image, feature information on whether the driver wears an accessory such as a sunglass and/or a mask.

The image analyzer 160 may analyze the face image and transmit at least one piece of feature information which is extracted, to the controller 110.

Also, the controller 110 may receive state information of a vehicle at the time when the face image of the driver is captured from the communication device 140.

The controller 110 may generate face data including one or more environmental conditions corresponding to the face image together with the face image. The one or more environmental conditions corresponding to the face image may include a plurality of environmental factors, that is, the feature information extracted from the face image and the state information of the vehicle received from the communication device 140. In the following description, at least one environmental condition corresponding to a face image is referred to as a 'first environmental condition'. The controller 110 may store the generated face data in the DB 150.

The controller 110 may acquire a face image and a first environmental condition in real time or at predetermined time intervals during driving of the vehicle. When the obtained first environmental condition differs from the environmental condition of the face data stored in the DB 150, the controller 110 may further generate face data including the obtained face image and the first environmental condition and store the same in the DB 150.

Accordingly, the DB 150 may store a plurality of pieces of face data including a face image of the driver captured at each time point and the first environmental condition of different environmental factors corresponding to the face image. On the other hand, the DB 150 may store face data corresponding to two or more drivers.

The controller 110 may configure a guidance screen and display the guidance screen on a display screen of the interface 120 during a driver face registration process.

Embodiments of the guidance screen displayed during the face registration process will be described with reference to FIGS. 3A, 3B, 4A, 4B, 4C and 5.

Figure 3A:
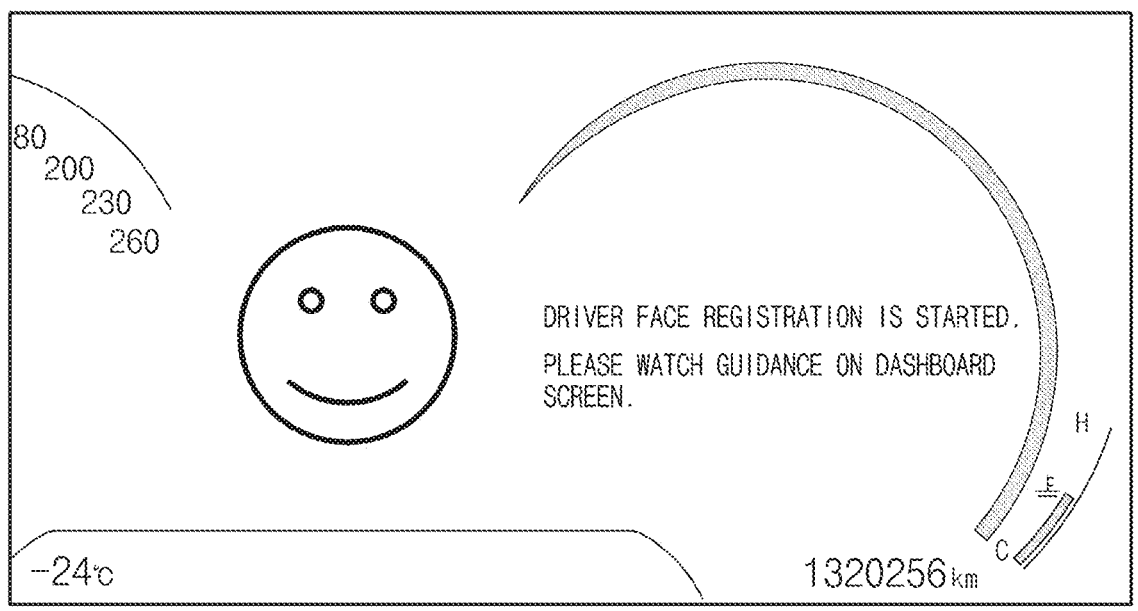
FIGS. 3A and 3B illustrate embodiments referred to describe operation of a face recognition apparatus according to an embodiment of the present disclosure.
Figure 3B:
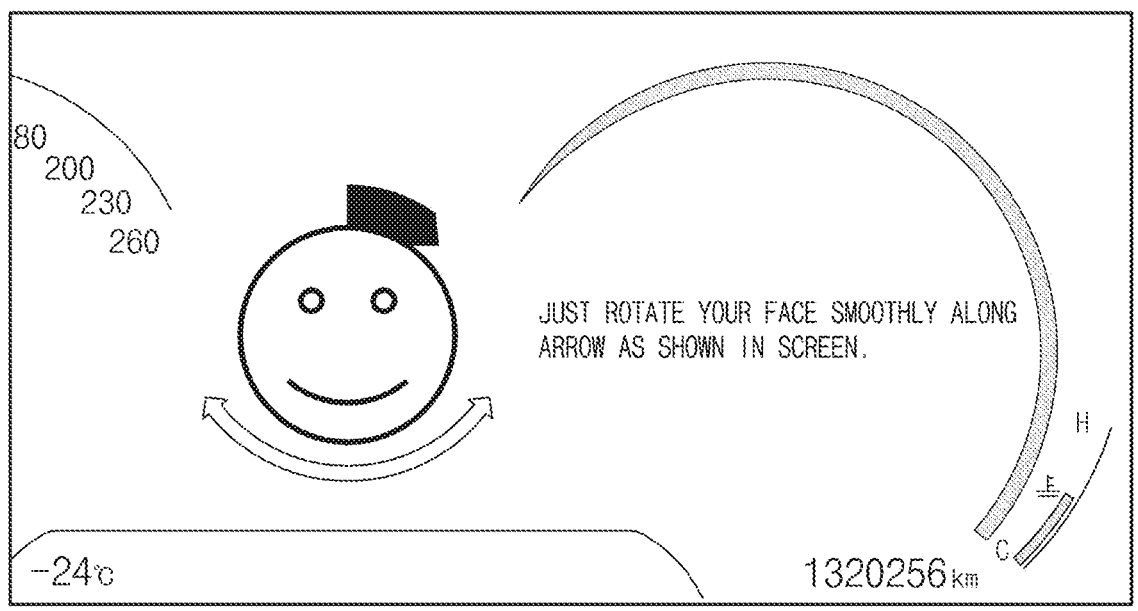

FIGS. 3A and 3B illustrate a start guidance screen for the face registration process, and FIGS. 4A, 4B, 4C and 5 illustrate a progress guidance screen for the face registration process.

When there is a new registration request for a face of a driver, the controller 110 may configure a first guidance screen including a message requesting a driver to gaze the camera 130 and display the first guidance screen on the display screen, as illustrated in FIG. 3A. Then, when the driver gazes the camera 130, the controller 110 may configure a second guidance screen for showing an operation for capturing a face image and display the second guidance screen on the display screen, as illustrated in FIG. 3B.

Figure 4A:
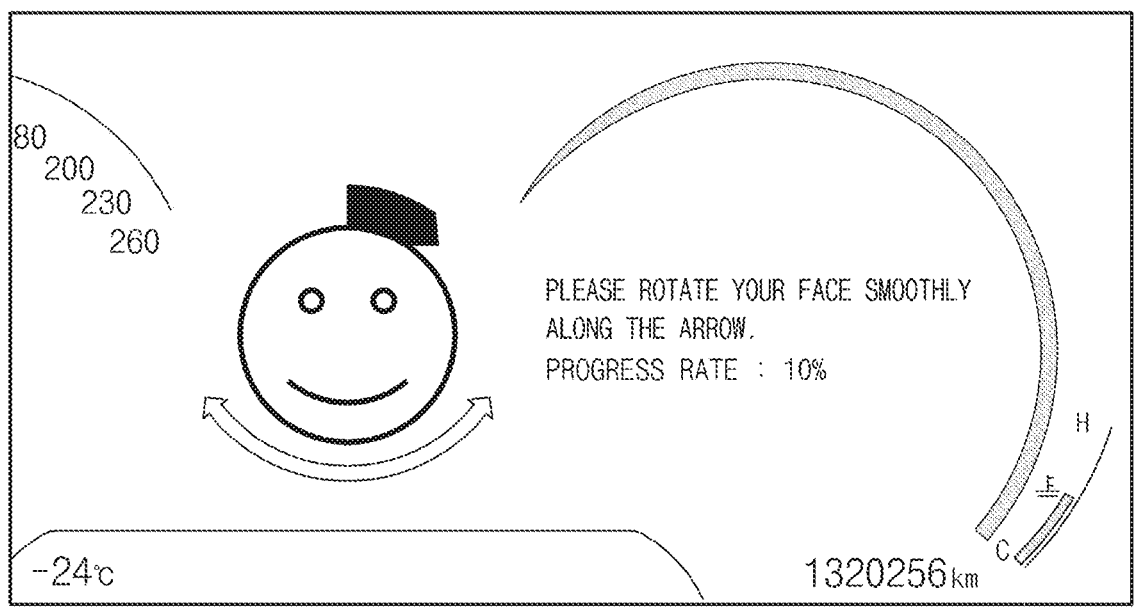
FIGS. 4A, 4B and 4C illustrate additional embodiments with regard to the operation of a face recognition apparatus.
Figure 4B:
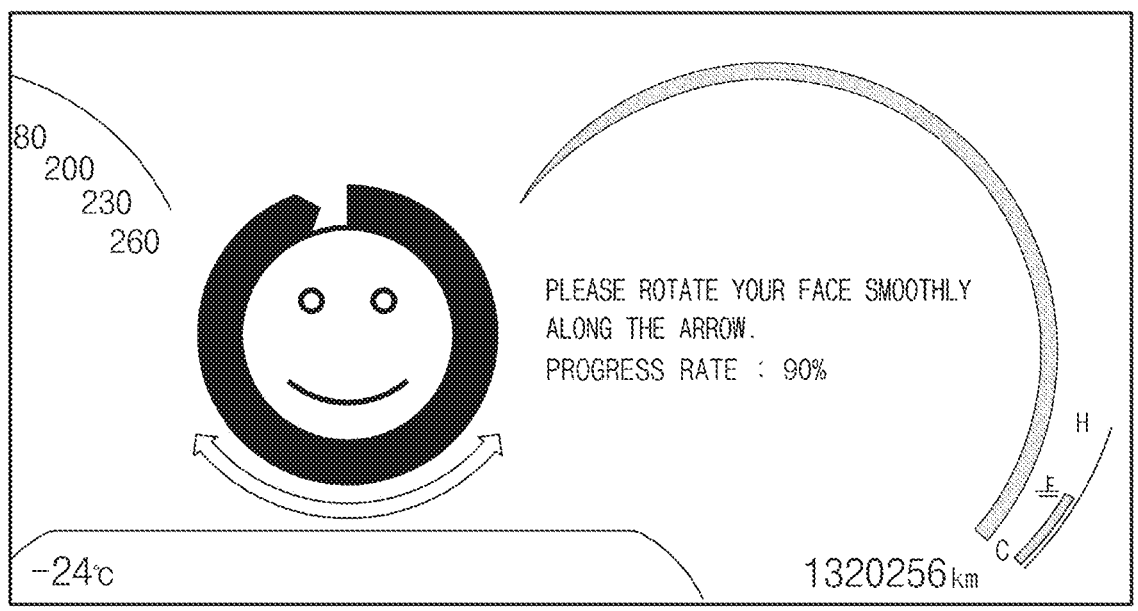
Figure 4C:
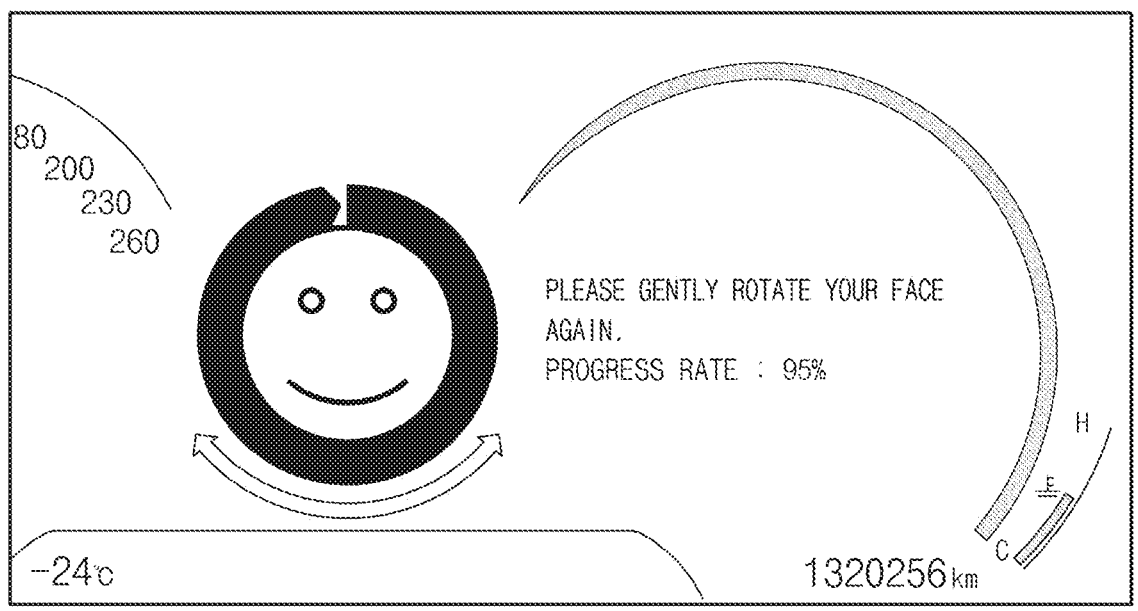
Figure 5:
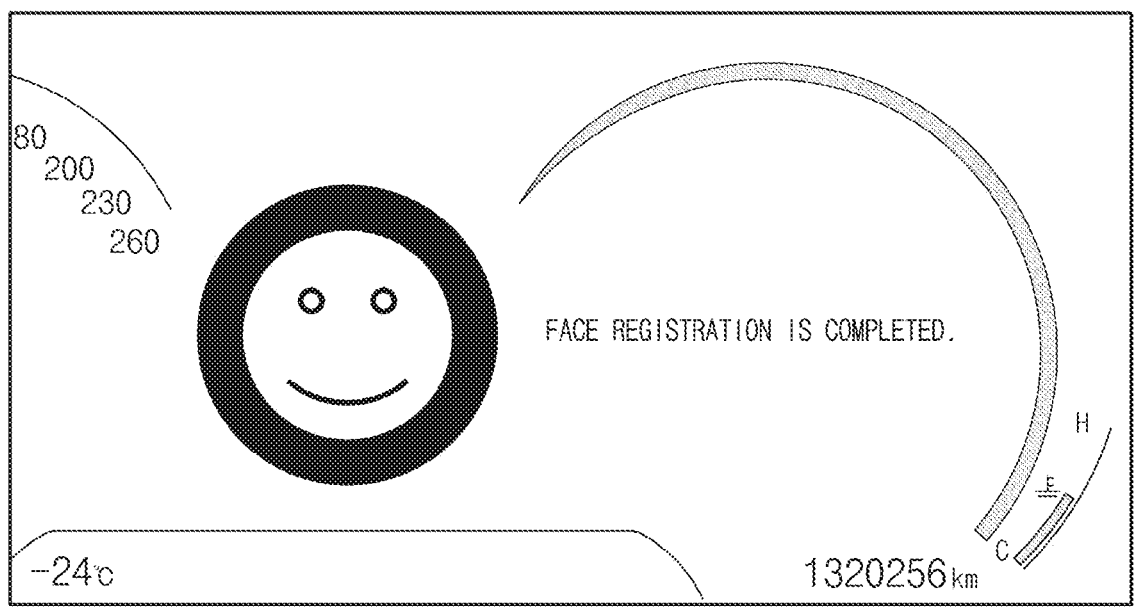

When capturing of the face image is started through the first and second guidance screens, the controller 110 may provide a registration progress rate through the third to fifth guidance screens as illustrated in FIGS. 4A to 4C. When the driver face registration process is completed, the controller 110 may configure a sixth guidance screen for showing the completion of registration and display the sixth guidance screen on the display screen as illustrated in FIG. 5.

The first to sixth guidance screens may include a guidance message, an emoticon, and/or a status bar. The guidance screen may further include means for showing a progress state of the face registration process.

The controller 110 may classify a plurality of pieces of face data stored in the DB 150 corresponding to the driver according to each of environmental factors of the first environmental condition included in each face data. An embodiment for classifying face data will be described with reference to FIG. 6.

FIG. 6 illustrates face data classified according to each environmental factor of the first environmental condition. Referring to FIG. 6, each face data may include a face image captured at each time point.

In addition, each face data may include a first environmental condition acquired at the time of capturing a face image. In this case, the first environmental condition may include environmental factors corresponding to feature information such as facial expression, a face direction, whether the driver wears sunglasses and/or whether the driver wears a mask. In addition, the first environmental condition may include environmental factors corresponding to state information such as whether a window is open or closed, whether a sunroof is opened, and/or a time zone.

The first face data of the pieces of face data in FIG. 6 may include environmental factors corresponding to the non-opened state of a window, the non-opened state of a sunroof, daytime, impassive expression, the front direction of a face, non-wearing of sunglasses, and non-wearing of a mask.

The second face data may include environmental factors corresponding to the non-opened state of a window, the non-opened state of a sunroof, daytime, impassive expression, the right direction of a face, non-wearing of sunglasses, and non-wearing of a mask.

The third face data may include environmental factors corresponding to the opened state of a window, the non-opened state of a sunroof, daytime, smiling expression, a front direction of a face, non-wearing of sunglasses, and non-wearing of a mask.

The fourth face data may include environmental factors corresponding to the non-opened state of a window, the non-opened state of a sunroof, daytime, impassive expression, a front direction of a face, non-wearing of sunglasses, and wearing of a mask.

The fifth face data may include environmental factors corresponding to the non-opened state of a window, the opened state of a sunroof, night time, impassive expression, a front direction of a face, wearing of sunglasses, and non-wearing of a mask.

As illustrated in FIG. 6, first through fifth face data differ from one another in at least one environmental factor.

Therefore, the face recognition apparatus 100 according to the present disclosure may improve performance of face recognition according to each environmental factor by using the face data of the driver classified according to each environmental factor of the first environmental condition.

When the face recognition function is performed, the controller 110 may acquire a face image at the time when the face recognition function is performed and an environmental condition at the time when the face is recognized. In the following description, an environmental condition at the time of recognizing the face is referred to as a second environmental condition. In this case, the controller 110 may respectively compare the environmental factors of the second environmental condition with the environmental factors of the first environmental condition included in the plurality of pieces of face data stored in the DB 150, and extract face data of the environmental condition having the highest degree of similarity to the second environmental condition. The controller 110 may recognize the face of a driver based on the face image of the extracted face data.

The controller 110 may control operations of the conversion device 170 and the determination device 180 so as to extract face data having the highest degree of similarity to the second environmental condition.

First, the conversion device 170 may encode each of environmental factors of the first environmental condition and the second environmental condition of the face data stored in the DB 150 according to a request of the controller 110.

An embodiment for encoding each environmental factor will be described with reference to FIG. 7.

FIG. 7 illustrates an embodiment in which environmental factors of a first environmental condition included in each face data stored in the DB 150 are encoded. The conversion device 170 may encode 'O' to '1' and 'X' to '0'. Also, the conversion device 170 may encode the 'day' time zone to '0' and encode the 'night' time zone to '1'. In addition, the conversion device 170 may encode facial expression corresponding to 'impassive expression' to '0' and encode facial expression corresponding to 'smiling expression' to '1'. In addition, the conversion device 170 may encode a 'front' face direction to '0', a 'left' face direction to '1', and a 'right' face direction to '2'.

Based on the above conditions, the conversion device 170 may encode environmental factors of the first face data to '0000000', as indicated by reference numeral 711 in FIG. 7. In addition, the conversion device 170 may encode environmental factors of the second face data to '0000200' as indicated by reference numeral 712 in FIG. 7. In addition, the conversion device 170 may encode environmental factors of the third face data to '1001000', as indicated by reference numeral 713 in FIG. 7.

The determination device 180 may compare codes corresponding to the environmental factors of the first environmental condition included in one or more face data with codes corresponding to the environmental factors of the second environmental condition to calculate Hamming distances. In this case, the determination device 180 may calculate a Hamming distance between the first environmental condition and the second environmental condition of the face data from a value obtained summing the Hamming distances for the environmental factors.

In the embodiment of FIG. 7, when it is assumed that the codes of the environmental factors of the second environmental condition is '0000000', as indicated by reference numeral 715 in FIG. 7, value '0' is calculated by summing the Hamming distances for the environmental factors of the environmental condition of the first face data and the second environmental condition, value '1' is calculated by summing the Hamming distances for the environmental factors of the environmental condition of the second face data and the second environmental condition, and value '2' is calculated by summing the Hamming distances for the environmental factors of the environmental condition of the third face data and the second environmental condition.

An embodiment for calculating a Hamming distance will be described with reference to FIG. 8.

FIG. 8 illustrates an embodiment for calculating a Hamming distance based on a code of each of the environmental factors of the first environmental condition and the second environmental condition. Referring to FIG. 8, No. 1 indicates a code of each environmental factor of the second environmental condition, and No. 2 indicates a code of each environmental factor of the first environmental condition included in the second face data.

In this case, when it is assumed that the codes of the environmental factors of the second environmental condition are '0000000' and the codes of the environmental factors of the first environmental condition are '0000200', the determination device 180 may calculate '0' when the codes of corresponding environmental factors among the first environmental condition and the second environmental condition are equal to each other by '0', as indicated by reference numeral 811 in FIG. 8, and calculate '1' when the codes of corresponding environmental factors among the first environmental condition and the second environmental condition are different from each other, as indicated by reference numeral 812 in FIG. 8.

In this manner, the Hamming distance for each environmental factor of the first environmental condition and the second environmental condition is calculated, and, in this case, the value obtained by summing the Hamming distances of the environmental factors is '1' (e.g., 0+0+0+0+1+0+0=1), as indicated by reference numeral 813.

The determination device 180 may determine a degree of similarity based on the calculated Hamming distance. In this case, the determination device 180 may determine that the degree of similarity between the two environmental conditions is higher as the calculated sum of the Hamming distances for the environmental factors is smaller.

Meanwhile, the determination device 180 may assign a weight to each environmental factor of an environmental condition, and may determine the degree of similarity by applying a weight to the calculated Hamming distance for each environmental factor.

An embodiment for assigning a weight to each environmental factor of an environmental condition and calculating a Hamming distance by applying a weight is described with reference to FIGS. 9A and 9B.

FIG. 9A illustrates an embodiment for assigning a weight to each environmental factor of an environmental condition, and FIG. 9B illustrates an embodiment for calculating a Hamming distance by applying a weight.

A larger weight may be given to the environmental factor that affects face recognition depending on a change in a condition. As an example, whether a sunroof is opened or closed may have a greater effect on face recognition than whether a window is opened or closed. In addition, whether a mask is worn may have a great effect on face recognition. Therefore, as illustrated in FIG. 9A, the determination device 180 may assign a weight of '1' to '2' to the environmental factor corresponding to window opening/closing, a weight of '3' to '4' to the environmental factor corresponding to sunroof opening, a weight of '1' to the environmental factor corresponding to the time zone, a weight of '2' to the environmental factors corresponding to facial expression, a face direction, wearing of sunglasses, and a weight of '3' to the environmental factor corresponding to wearing of a mask.

In this case, the weights corresponding to the environmental factors such as whether the windows are opened or closed, whether the sunroof is opened, and the time zone, which are affected by a change in light environment, may be subdivided and given in accordance with a camera exposure value, instead of the fixed values.

As an example, when the camera exposure value is less than the reference value for the environmental factor corresponding to whether the window is open or closed, the weight '1' is assigned, and when the camera exposure value is equal to or greater than the reference value, the weight '2' may be assigned.

As shown in FIG. 9A, when a weight is assigned to each environmental factor in the environmental condition, the determination device 180 may calculate a Hamming distance between the first environmental condition and the second environmental condition from the sum of the values obtained by multiplying the Hamming distance calculated for each environmental factor and the weight.

When a weight is not assigned as illustrated in FIG. 7, the Hamming distance calculated for the environmental condition of the second face data is '1', while when a weight is assigned as illustrated in FIG. 9B, the Hamming distance calculated for the environmental condition of the second face data is '2'.

Therefore, the determination device 180 may more accurately determine the degree of similarity between the first environmental condition and the second environmental condition of each face data by assigning weights.

In this case, the controller 110 may extract face data having the highest degree of similarity to the second environmental condition according to a result of the determination of the determination device 180. As an example, the controller 110 may extract face data having a hamming distance of '0' in comparison with the second environmental condition. On the other hand, when there is no face data having a hamming distance of '0' in comparison with the second environmental condition, the controller 110 may extract face data having the shortest Hamming distance. Accordingly, the controller 110 may recognize a face of a driver based on the face image of the extracted face data.

When there is a plurality of pieces of extracted face data, the controller 110 may perform driver face recognition based on the face data having a lower weight among the weights applied to the Hamming distance of each environmental factor among the plurality of pieces of extracted face data. In this case, because the larger weight may be given to the environmental factor as the environmental factor more greatly affects the face recognition, face recognition performance may increase as the face data has a lower weight applied to the Hamming distance is given.

The face recognition apparatus 100 according to the embodiment, which operates as above, may be implemented in the form of an independent hardware device including memory and a processor that processes each operation, and may operate in the form of being included in another hardware device such as a microprocessor or a general purpose computer system.

The operation flow of the face recognition apparatus according to the present disclosure, which is configured as above, is described in detail below.

Figure 10:
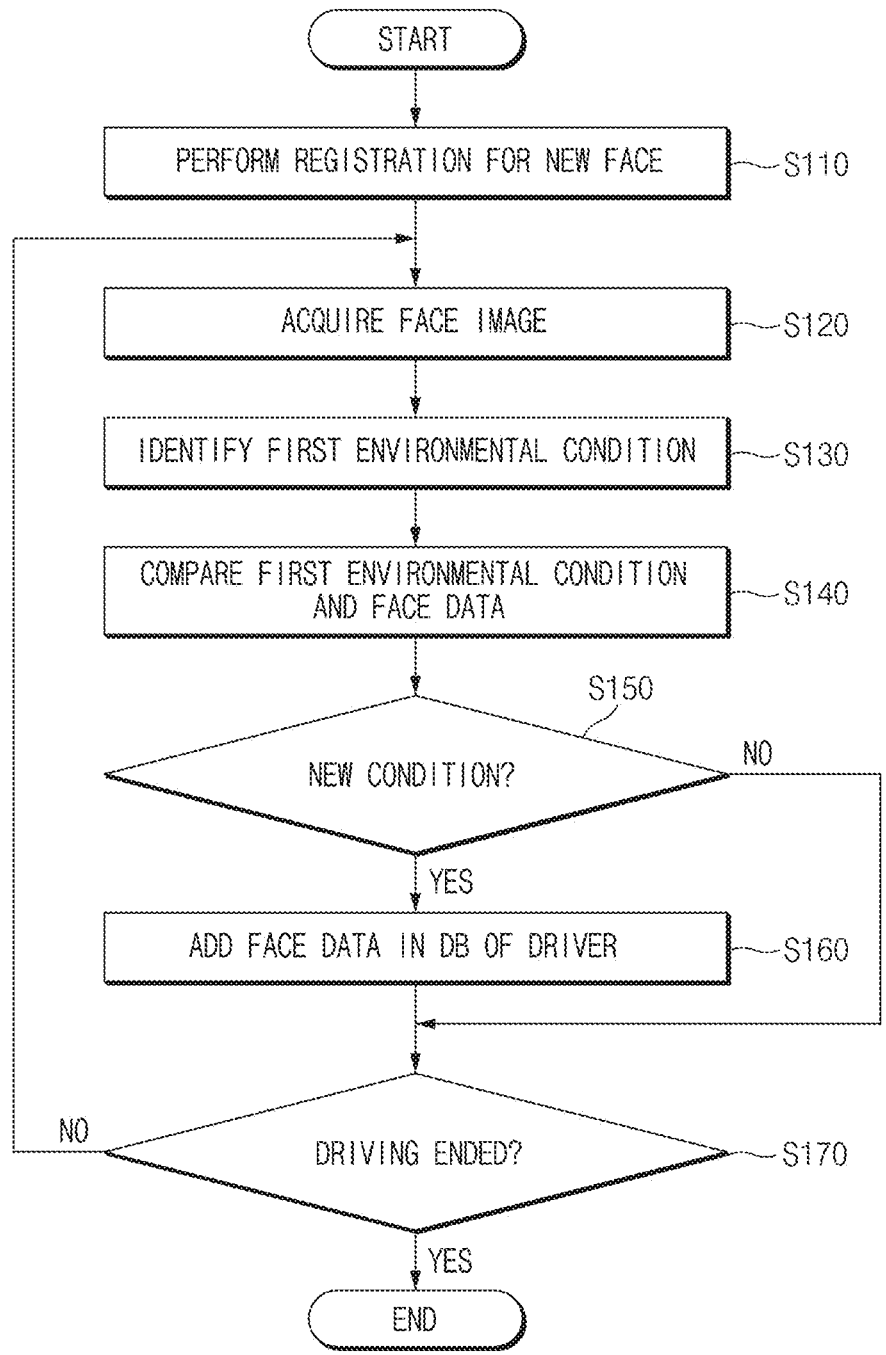
FIGS. 10 and 11 are flowcharts of operation of a method according to an embodiment of the present disclosure.

FIG. 10 is a flowchart of a face registration method of a face recognition apparatus according to an embodiment of the present disclosure.

Referring to FIG. 10, when a new face registration function is performed according to the driver's request (S110), the face recognition apparatus 100 may acquire a face image of a driver captured by the camera 130 (S120). In this case, the face recognition apparatus 100 may identify the first environmental condition at the time at which the face image is captured, based on the face image acquired in step S120 and information received through the communication device 140 (S130).

The face recognition apparatus 100 may classify face data registered in the DB 150 according to the first environmental condition included in each face data (S140) and compare the first environmental condition identified in step S130 with the face data previously registered in the DB 150.

When the first environmental condition identified in step S130 corresponds to a new condition not included in the previously registered face data (S150), the face recognition apparatus 100 may add a face data including a face image and a first environmental condition to the DB 150 of the driver (S160).

The steps from S120 to S160 may be repeatedly performed until the driving of the vehicle is terminated. When the driving of the vehicle is terminated (S170), the face recognition apparatus 100 may end related operation.

Figure 11:
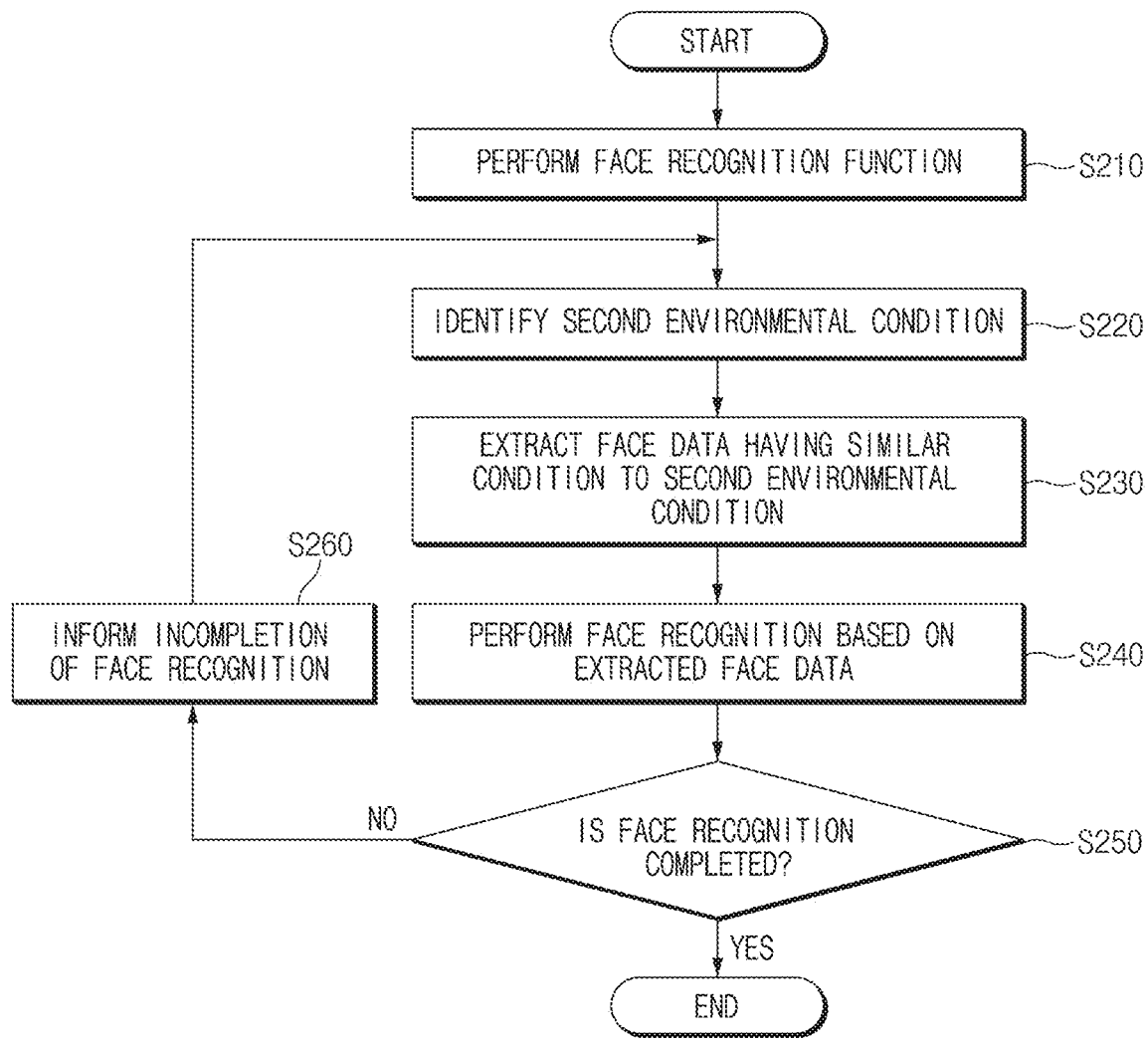

FIG. 11 illustrates a flowchart of a face recognition method for a face recognition apparatus according to an embodiment of the present disclosure.

Referring to FIG. 11, when a face recognition function is performed (S210), the face recognition apparatus 100 may identify a second environmental condition at the time when the face recognition function is performed (S220).

The face recognition apparatus 100 may compare the second environmental condition identified in step S220 with the first environmental condition included in the plurality of pieces of face data stored in the DB 150 and extract face data having a similar condition to the second environmental condition (S230). A specific description of the operation of extracting face data having a similar condition to the second environmental condition is given by referring to embodiments of FIGS. 7 to 9A.

Thereafter, the face recognition apparatus 100 may perform a face recognition operation based on the face image of the face data extracted in step S230 (S240).

The face recognition apparatus 100 may end a related operation when driver face recognition is completed in step S240 (S250). On the other hand, when the driver face recognition is not completed even by step S240, the face recognition apparatus 100 may inform the user of incompletion state of face recognition (S260), and again perform the steps after S220.

Figure 12:
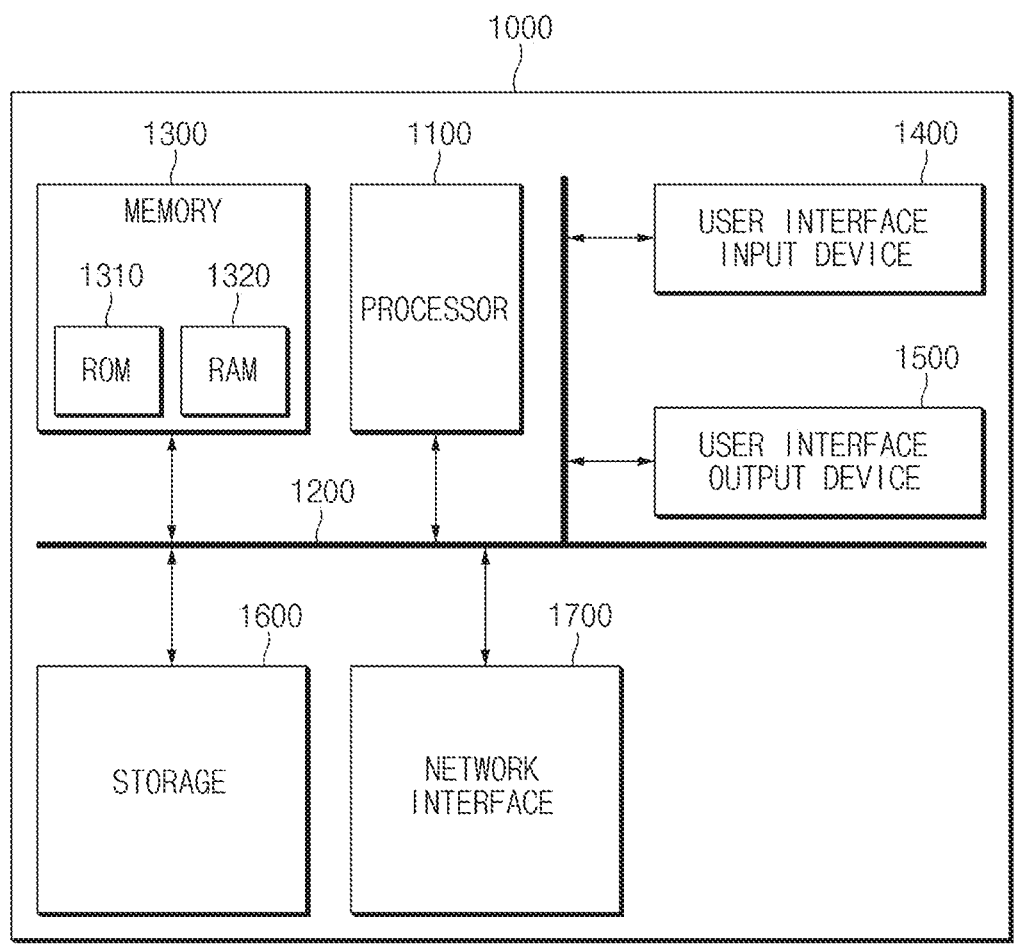
FIG. 12 illustrates a computing system performing a method according to an embodiment of the present disclosure.

FIG. 12 illustrates a computing system performing a method according to an embodiment of the present disclosure. Referring to FIG. 12, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module performed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to the present disclosure, it is possible to prevent performance of driver face recognition from being degraded due to a change in an environmental factor by classifying and storing face data according to a plurality of environmental conditions of a driver.

In addition, according to the present disclosure, it is possible to improve performance of face recognition by assigning a weight to each environmental factor, calculating a hamming distance, and performing face recognition based on face data having a similar condition.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A face recognition apparatus comprising:
    a camera configured to capture a face image a driver;
    a database (DB) configured to store face data including the face image and one or more environmental conditions corresponding to the face image;
    a controller configured to, when a face recognition function is performed, extract the face data from the DB based on an environmental condition at a time of recognizing a face, and recognize a face of the driver based on a face image of the extracted face data; and
    a determination device configured to compare environmental factors of an environmental condition included in the face data with environmental factors of the environmental condition at the time of recognizing the face, calculate a Hamming distance for each of the environmental factors, and determine a degree of similarity based on the calculated Hamming distances for the environmental factors;
    wherein the determination device determines that the degree of similarity is higher as a sum of the calculated Hamming distances for the environmental factors is smaller.

2. The face recognition apparatus of claim 1, wherein the controller extracts face data of an environmental condition having a highest degree of similarity to the environmental condition at the time of recognizing the face, among the face data stored in the DB.

3. The face recognition apparatus of claim 1, further comprising:
    a conversion device configured to encode each of the environmental factors of the environmental condition included in the face data and the environmental condition at the time of recognizing the face,
    wherein the determination device calculates a Hamming distance by performing comparison on the encoded environmental factors.

4. The face recognition apparatus of claim 3, wherein the determination device calculates a Hamming distance of a corresponding environmental factor as '0' when codes of environmental factors corresponding to each other, among the environmental condition included in the face data and the environmental condition at the time of recognizing the face, are equal to each other and calculates the hamming distance as '1' otherwise.

5. The face recognition apparatus of claim 1, wherein the determination device assigns weights to the environmental factors respectively, and determines the degree of similarity by respectively applying the weights to the calculated Hamming distances for the environmental factors.

6. The face recognition apparatus of claim 5, wherein the controller, when the extracted face data includes a plurality of pieces of face data, performs recognition of the face of the driver based on face data having a lower weight than a certain value among the plurality of pieces of face data applied to a Hamming distance of each environmental factor of the extracted face data.

7. The face recognition apparatus of claim 1, wherein the environmental condition includes at least one environmental factor of feature information extracted from the face image and vehicle state information.

8. The face recognition apparatus of claim 7, further comprising:
    an image analyzer configured to extract the feature information by analyzing the face image.

9. The face recognition apparatus of claim 7, further comprising:

a communication device configured to receive the vehicle state information.

10. The face recognition apparatus of claim 1, wherein the controller acquires the face image and one or more environmental conditions corresponding to the face image in real time or at predetermined time intervals during driving of a vehicle.

11. The face recognition apparatus of claim 1, wherein the controller further generates face data including the acquired face image and an environmental condition corresponding to the face image when the environmental condition corresponding to the face image is different from an environmental condition of face data pre-stored corresponding to the driver.

12. A face recognition method comprising:
   capturing a face image of a driver;
   storing face data including the captured face image of the driver and one or more environmental conditions corresponding to the face image in a database (DB); and
   when a face recognition function is performed, extracting pre-stored face data from the DB based on an environmental condition at a time of recognizing a face and recognizing a face of the driver based on a face image of the extracted face data;
   comparing environmental factors of the environmental condition included in the face data with environmental factors of the environmental condition at the time of recognizing the face and calculating a Hamming distance for each of the environmental factors; and
   determining the degree of similarity based on the calculated Hamming distance for each of the environmental factors;
   wherein the determining of the degree of similarity includes determining that the degree of similarity is higher as a sum of the calculated Hamming distances for the environmental factors is smaller.

13. The face recognition method of claim 12, wherein the recognizing of the face of the driver includes:
   determining a degree of similarity between an environmental condition included in the face data stored in the DB and the environmental condition at the time of recognizing the face; and
   extracting face data of an environmental condition having a highest degree of similarity to the environmental condition at the time of recognizing the face, among the face data stored in the DB.

14. The face recognition method of claim 12, wherein the calculating of the Hamming distance for each of the environmental factors includes:
   encoding the environmental factors of the environmental condition included in the face data and the environmental condition at the time of recognizing the face; and
   calculating the Hamming distance by performing comparison on the encoded environmental factors.

15. The face recognition method of claim 14, wherein the calculating of the Hamming distance for each of the environmental factors includes calculating a Hamming distance of a corresponding environmental factor as '0' when codes of environmental factors corresponding to each other, among the environmental condition included in the face data and the environmental condition at the time of recognizing the face, are equal to each other, and calculating the Hamming distance as '1' otherwise.

16. The face recognition method of claim 12, wherein the determining of the degree of similarity further includes:
   assigning a weight to each environmental factor; and
   determining the degree of similarity by applying the weight to the calculated Hamming distance for each environmental factor.

17. The face recognition method of claim 16, wherein the recognizing of the face of the driver includes, when the extracted face data includes a plurality of face data, performing recognition of the face of the driver based on face data having a lower weight than a certain value among the plurality of pieces of face data applied to the Hamming distance for each environmental factor of the extracted face data.

18. The face recognition method of claim 12, wherein the environmental condition includes at least one environmental factor of feature information extracted from the face image and vehicle state information.

19. The face recognition method of claim 12, further comprising:
   extracting feature information by analyzing the face image.

20. The face recognition method of claim 12, further comprising:
   receiving vehicle state information.

21. The face recognition method of claim 12, further comprising:
   acquiring the face image and one or more environmental conditions corresponding to the face image in real time or at predetermined time intervals during driving of a vehicle.

22. The face recognition method of claim 21, further comprising:
   generating face data including the acquired face image and environmental conditions corresponding to the face image when the environmental condition corresponding to the face image is different from an environmental condition of face data pre-stored corresponding to the driver.

* * * * *